May 9, 1939.   A. BRAUN   2,157,475
AIR SPACE INSULATED SIGNALING CABLE
Filed Nov. 21, 1936
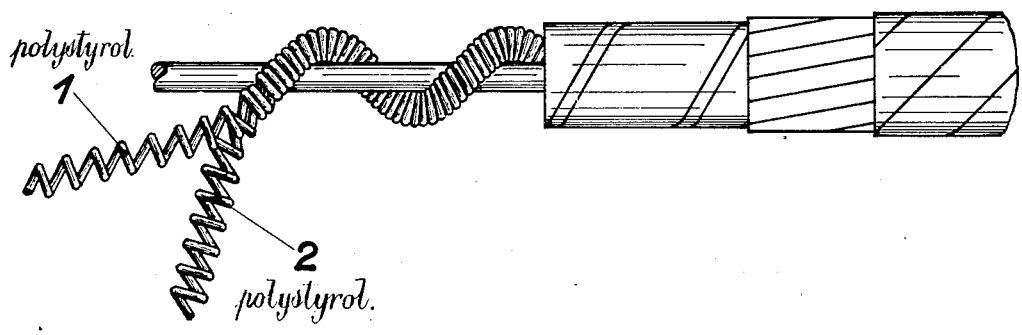
A. Braun
Inventor

UNITED STATES PATENT OFFICE 2,157,475

AIR SPACE INSULATED SIGNALING CABLE

Alfred Braun, Cologne-Mulheim, Germany, assignor to Felten & Guilleaume Carlswerk Actien-Gesellschaft, Cologne-Mulheim, Germany Application November 21, 1936, Serial No. 112,157
In Germany November 27, 1935

1 Claim. (Cl. 174—29)

It is known in electric signaling cables to use an air-space insulation consisting of helices of rigid insulating substances helically wound around the conductor, more particularly, helices of polystyrol, which, in order to ensure the required stability, have to be made rather thick. Thick threads of polystyrol, however, have the disadvantage that they are less flexible, and cannot be so easily formed into helices as the thin ones. It is, therefore, proposed, according to the present invention, to use for the building up of the air space insulation, instead of known helices which consist of a thick thread, such helices which consist of two parallel thin threads.

The accompanying drawing illustrates, by way of example, a helix consisting of two thin threads 1 and 2 placed around the conductor to form the air-space insulation.

Such a helix may, for instance, be obtained by shaping two threads running parallel to one another in a manner known per se, instead of the helix hitherto usual. It is to be understood that the helices may be made of more than two thin threads.

What I claim is:

In electric signaling cables a conductor and a self-supporting compound helix forming an air-space insulation around the said conductor, which self-supporting compound helix is wound helically around the said conductor so that its axis runs helically around the conductor and the compound helix consisting of a plurality of thin helical threads of polystyrol forming separate helices coaxially with one another.

ALFRED BRAUN.